July 10, 1951 B. DERJAVITCH 2,559,603

ELECTRICAL PULSE TRAIN SELECTING SYSTEM

Filed Jan. 20, 1948 3 Sheets-Sheet 1

INVENTOR.
BORIS DERJAVITCH

BY Robert Harding Jr.

ATTORNEY

INVENTOR.
BORIS DERJAVITCH
BY Robert Harding Jr.
ATTORNEY

July 10, 1951 B. DERJAVITCH 2,559,603

ELECTRICAL PULSE TRAIN SELECTING SYSTEM

Filed Jan. 20, 1948 3 Sheets-Sheet 3

INVENTOR.
BORIS DERJAVITCH
BY Robert Harding Jr.
ATTORNEY

Patented July 10, 1951 2,559,603

UNITED STATES PATENT OFFICE 2,559,603

ELECTRICAL PULSE TRAIN SELECTING SYSTEM

Boris Derjavitch, Paris, France, assignor to International Standard Electric Corporation, New York, N. Y., a corporation of Delaware Application January 20, 1948, Serial No. 3,253
In France October 5, 1946

Section 1, Public Law 690, August 8, 1946
Patent expires October 5, 1966

8 Claims. (Cl. 179—15)

The present invention relates to improvements in electrical communication systems.

The devices according to the invention are particularly applicable to electronic switching telephone communication systems employing impulse modulation, of the kind described in the patent application Serial No. 128,613, filed on November 14, 1945, now abandoned, under the title "Improvements in Electrical Communication Systems."

One of the objects of the present invention is to establish a link by means of a common circuit between a given individual circuit that forms part of a first group of circuits and an idle individual circuit of a second group of circuits, and to maintain this link as long as desired. Thus, for example, a subscriber's line will be able to select an idle connection circuit of the central office, or a connection circuit will be able to select an idle register.

Another object is to prevent an incoming call from being able to seize two or more idle circuits.

Another object is to prevent any interference between several simultaneously established connections.

According to one feature of the present invention, the circuits to be selected are arranged in series, and it is the first idle circuit of this series that is selected. The first impulse sent by a calling circuit selects the idle circuit and occupies it, and the occupation is maintained by the subsequent impulses that come from this same circuit, passing over a different path.

According to another feature, an impulse sent by a calling circuit opens the passage leading to the selected circuit to the next impulse intended for that circuit, and does this through the intermediary of a control circuit that forms part of the selected circuit. The control circuit of an occupied circuit prevents that circuit from receiving impulses proceeding from calling circuits other than the one that has already occupied it.

According to another feature, the circuit seizure or occupation devices may consist of electromechanical or electronic means that transmit the impulses, or divert them in order to prevent them from entering certain circuits.

Other objects, characteristics and advantages of the present invention will be found upon reading the following description given with reference to the appended drawings, in which.

In communication systems that make use of impulses, the subscriber lines successively send impulses over a common conductor, each line being characterized by the position that these impulses occupy in a repetition cycle. The time interval that separates the impulses of a line is equal to the duration of the cycle.

Figure 1:
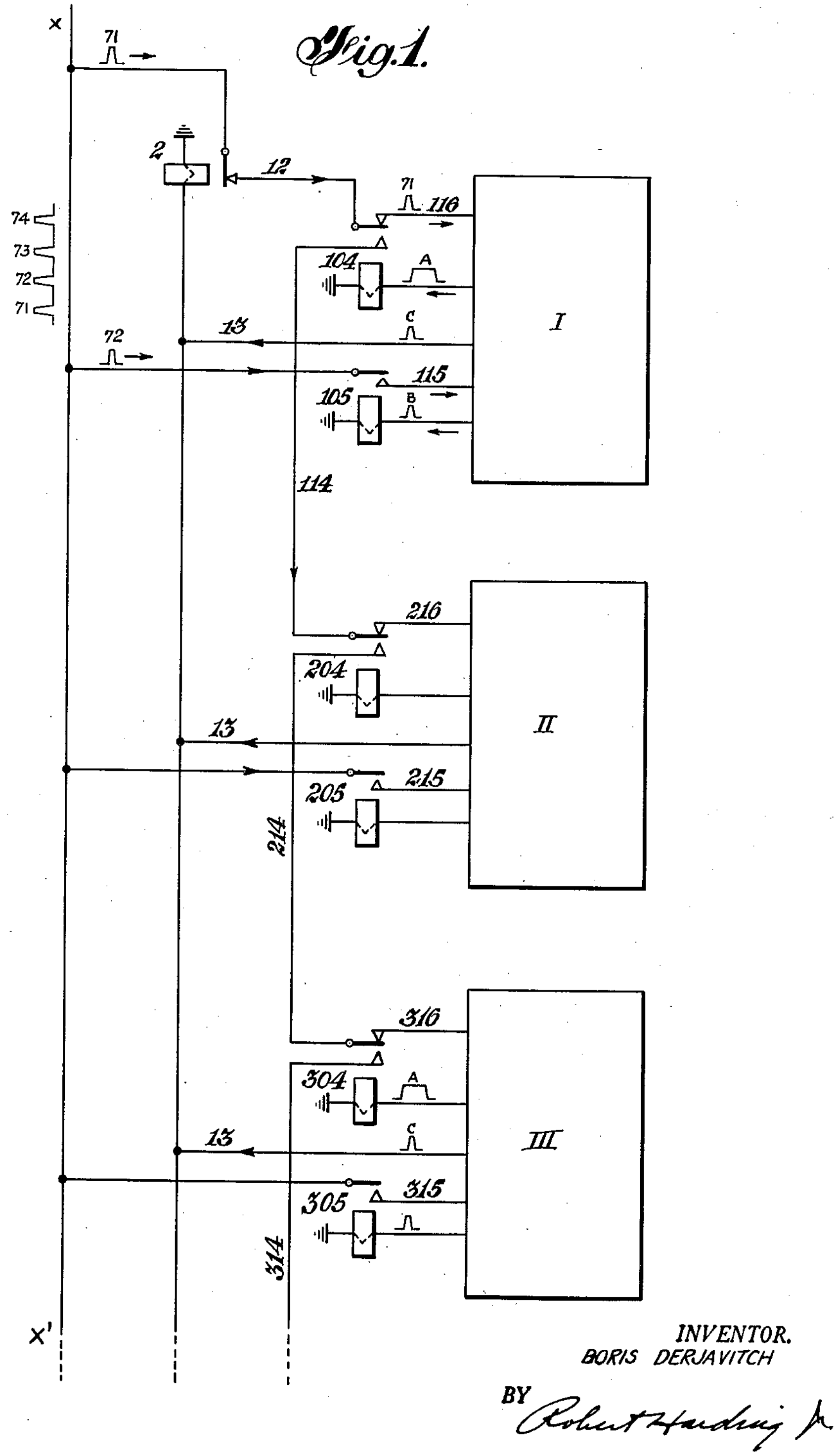
Fig. 1 illustrates one embodiment of a device employing electromechanical means that incorporates features of the invention.

As shown in Fig. 1, all the impulses proceeding from calling lines reach conductor XX′ and are directed to one of the control circuits I, II, III, etc., which are respectively preceded by relay groups 104—105, 204—205, 304—305, etc. A first impulse 71 of a call is employed for the seizure of an idle circuit such as I, II, III; and impulses 72, 73 and the subsequent ones ensure the holding up of the circuit seized by impulse 71.

Relay 2, which is controlled by circuits I, II, III, etc., prevents impulse 72 and the subsequent ones from passing over conductor 12 when each of the impulses of the calling lines occupies one of the circuits I, II, III, etc.

All the control circuits I, II, III, etc. operate in the same manner. Thus the first circuit I receives impulses 71 over conductor 116, and impulses 72 and the subsequent ones over conductor 115. These impulses produce control impulses A, B, C. Impulse A (a long one) operates relay 104 during the time interval that separates two successive impulses proceeding from the same line, e. g. 71 and 72. Impulses B and C (short ones) are produced at the moment of arrival of the next impulse of the same call. B operates relay 105, and C operates relay 2. Relay 2, which is common to all the circuits I, II, III, is energized by all the operating circuits at the moment when impulse 72 and the subsequent ones appear.

If the first control circuit I is idle, the first impulse 71 that appears at XX′ passes over the rest contact of 2 and the rest contact of 104, and enters circuit I. The long impulse A produced in circuit I energizes relay 104 and extends conductor 12 over conductor 114 to the next control circuits.

After one recurrent cycle, impulse 72 appears at XX′. Impulse C produced by impulse 71 energizes relay 2 and disconnects conductor 12, thus preventing impulse 72 from propagating over conductors 12 and 114 to the next control circuits. On the other hand, impulse B energizes relay 105.

and control circuit I receives impulse 72 over the operating contact of 105. Impulse 72 in its turn produces impulses A, B, C over the control circuit, and the cycle of operations begins again. The connection is accordingly established for circuit I.

If another call appears, impulse 71 of this new call will be produced for the duration of an impulse A of circuit I, and between two impulses C of the same circuit. It will take the following path: conductor XX', rest contact of relay 2, conductor 12, operating contact of 104, conductor 114, rest contact of 204, conductor 216, and will enter circuit II if it is idle.

In all cases, a single control circuit is connected to the rest contact of relay 2 when a call appears, and is disconnected as soon as it is seized, the connection with XX' being then maintained by one of the relays 105, 205, 305, etc. It is to be noted that two or more simultaneous calls do not make use of XX' at the same moment because their impulses are not produced simultaneously.

Figures 2, 4:
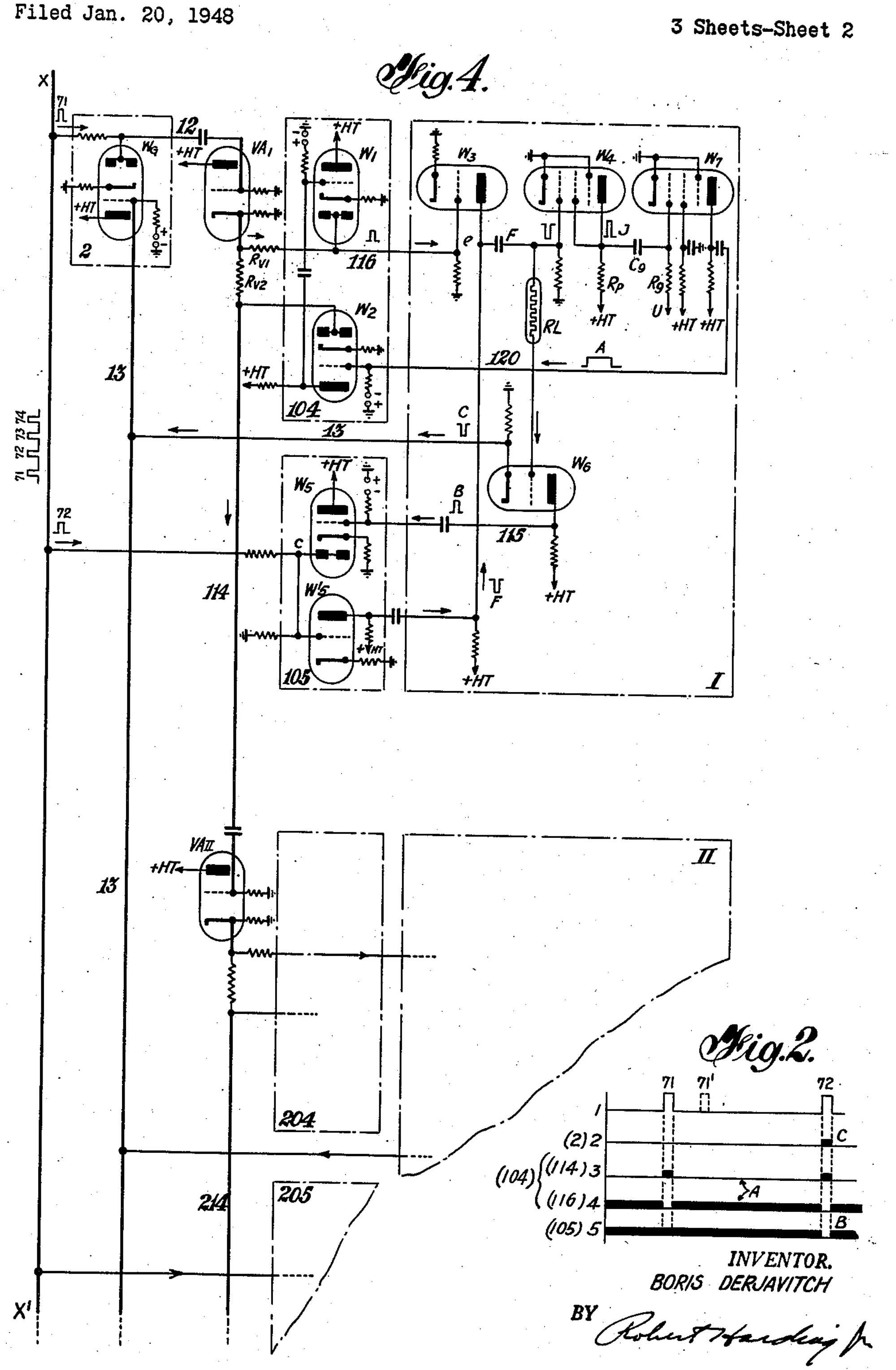
Fig. 2 is a graph of the operation of a device according to the invention.
Fig. 4 shows a different embodiment employing impulse diverting electronic means.

Fig. 2 makes it easier to understand the operation of the device of Fig. 1. In this graph, the times are plotted as abscissas. The first line shows the impulses 71 and 72 of one line, and an impulse 71' of another line. In the other lines, the heavy stroke indicates a closed passage, and the thin stroke indicates an open passage. The graph also shows the impulses A, B and C that control the various connections.

The second line shows the operation of relay 2, which normally permits passage of the first impulse 71, but operates under the action of impulse C and breaks the path for impulse 72 and the subsequent ones.

The third and fourth lines show the operation of relay 104, and this makes it possible to follow the passage of the impulses 71' of the other incoming calls to the next control circuits. Under the action of impulse A, relay 104 operates, breaks the link (116) leading to circuit I, and establishes the link (114) to the next circuits. Thus the impulses 71' of new incoming calls are directed to the control circuits II, III, etc.

The operation of relay 105 is shown on the fifth line. Under the action of impulse B, relay 105 operates and provides a path for the impulses 72 of the call that has occupied circuit I. These impulses 72 will now pass under the control of relay 105 and will ensure the keeping of circuit I in operation. They cannot pass over conductor 116 (line 4) although it is connected, because the path is broken by the energization of relay 2 (line 2).

Figure 3:
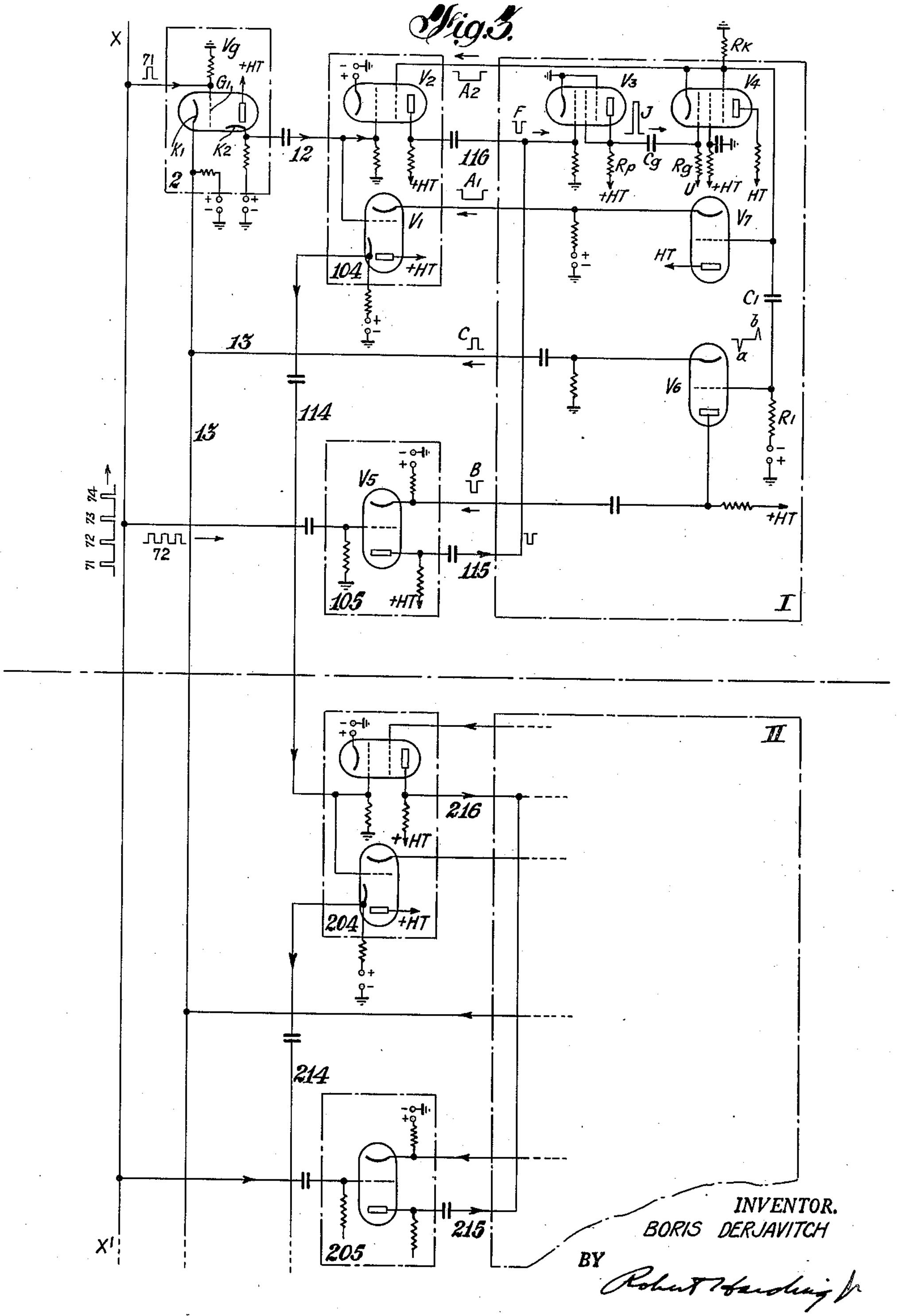
Fig. 3 shows an embodiment employing impulse transmitting electronic means.

Fig. 3 shows an example of embodiment in which vacuum tubes are employed. In this Fig. 3 a single control circuit I is shown in detail. The reference numbers are the same as those used in Fig. 1. The common conductor XX' receives impulses 71, 72 and the subsequent ones. Relay 2 is represented by a vacuum tube $Vg$ that is common to all the circuits I, II, III, etc. This tube $Vg$ is a secondary emission tube with two cathodes $K_1$ and $K_2$, and it furnishes at the output (by cathode $K_2$) impulses that are amplified and in phase with the input impulses. This tube is normally at the cut-off by a positive potential on cathode $K_1$; it permits passage of the first positive impulse (71) applied to its control grid $G_1$, and will be blocked by the positive impulses C applied to cathode $K_1$ by conductor 13. This tube $Vg$ will not permit passage of impulses 72 and the subsequent ones, thus acting the part of relay 2 by electronic means.

Relay 104 is represented by the two vacuum tubes $V_1$ and $V_2$, respectively controlled by two long impulses $A_1$ and $A_2$ furnished by control circuit I. The negative impulse $A_1$ releases tube $V_1$ and permits passage of the impulses 71' of the other lines over conductor 114 to the next control circuits. Negative impulse $A_2$, on the other hand, blocks tube $V_2$ and prevents the impulses 71' of the other lines from entering control circuit I. This acts just the same as reversing relay 104 shown in Fig. 1. $V_1$ is a tube similar to $Vg$, and $V_2$ is a tube with two control grids.

Finally, relay 105 is represented by tube $V_5$, which is released by the negative impulse B proceeding from control circuit I. At the output of $V_5$, an impulse is furnished by 115 to control circuit I in order to keep it in operation.

It is accordingly sufficient to show that the control circuit, under the action of impulses F proceeding either from 104 or 105, furnishes the impulses $A_1$, $A_2$, B and C.

An embodiment of the control circuit taken as an example comprises vacuum tubes $V_3$, $V_4$, $V_6$ and $V_7$. The part played by tubes $V_3$ and $V_4$ is that of furnishing a square signal of a duration $T-dt$, T being the duration of a cycle, and $dt$ the duration of a line impulse. Tube $V_3$ plays the part of a switch that passes from potential $v1$ when there are no impulses to potential $v2$ during the passage of impulses F, so that at the output of stage $V_3$ there is obtained a positive impulse J of high potential $v2$ (line 5), which effects the charging of condenser $Cg$ across a charging resistance $Rp$ of tube $V_3$, the cathode-grid resistance of tube $V_4$ and a cathode resistance $Rk$.

After the passage of impulse J, condenser $Cg$ is again at the potential $v1$. This reduction of potential, which is transmitted to the control grid of $V_4$ brought to a positive potential U, makes it negative and condenser $Cg$ discharges slowly across the leakage resistance of grid $Rg$ and, in parallel, resistance $Rp$ and internal resistance-feed source of tube $V_3$. The time constant of this discharge circuit is arranged so as to produce a square signal on the cathode of $V_4$ at the terminals of $Rk$, and of a duration equal to $T-dt$.

Impulse $A_2$ furnishes impulse $A_1$ through a tube $V_7$.

Furthermore, the same impulse $A_2$, when passing over circuit $C_1$ provided for tapping its flanks, furnishes two short impulses $a$ and $b$, of which only impulse $b$ corresponding to the rear flank is employed for furnishing a positive impulse C to the cathode of tube $Vg$ and a negative impulse B to the cathode of tube $V_5$.

The control circuit accordingly furnishes through tubes $V_3$, $V_4$, $V_6$ and $V_7$, the impulses $A_1$, $A_2$, B and C necessary for the operation of the device.

In Fig. 3, the various electrodes of the tubes are polarized by means of sources of voltage, the polarities of which are indicated.

The propagation of the various impulses and their sequences in the various circuits can be figured from the drawing by making diagrams in the conventional way employed in studying circuits that use impulses.

Fig. 4 illustrates another embodiment employing electronic means. In this circuit, the connections do not transmit the impulses, but establish short-circuits that divert the impulses to ground and prevent them from propagating in the circuit.

These short-circuits are obtained by connections arrangements that comprise diodes-triodes ($Wg$, $W_1$, $W_2$, $W_5$).

Take tube $W_5$, for example. Normally, the grid potential is negative and, since the tube does not deliver, the cathode is at ground potential. When a positive control impulse B is applied to the grid of $W_5$, the impedance of the triode portion of this tube is relatively low, and the impedance of the diode portion is consequently relatively high. In this case, impulses 72 that arrive at point C do not pass to ground through the diode portion of tube $W_5$, but bring the grid of tube $W'_5$ to a positive potential, so that impulses can pass through this tube. In the case of tube $Wg$, in which the grid is normally positive, the mode of operation is the same, but under the action of negative control impulses C.

Fig. 4 illustrates two control circuits I and II. The common conductor XX' is traversed by impulses 71, 72 and the subsequent ones. Relay 2 is constituted by the diode-triode tube $Wg$, the grid of which is brought to a positive potential and is controlled by the impulses proceeding from control circuits I, II, etc. over conductor 13.

Impulse 71 proceeding from XX' propagates toward $VA_1$, which operates as "cathode follower" amplifier. Relay 104 is constituted by tubes $W_1$ and $W_2$ and their associated resistances $RV_1$ and $RV_2$ controlled by the wide positive impulses (A) that proceed from $W_7$ over conductor 120. These impulses A, which are changed in sign by the triode portion of $W_2$, control the grid of $W_1$.

When there are no impulses on conductor 120, tube $W_1$ permits passage of the impulses proceeding from 12, and tube $W_2$ stops them if control circuit I is idle. On the other hand, under the action of impulses A on 120, tube $W_1$ stops the impulses 71' of the other calls, and $W_2$ permits them to pass over conductor 114 to tube VA II, the amplifier of the next control circuit.

Finally, tube $W_5$ associated with tube $W'_5$ corresponds to relay 105. Impulse B proceeding from $W_6$ releases tube $W_5$, which permits the passage of impulse 72 to $W'_5$. Impulse F, which keeps control circuit I in operating condition, is picked up at *e*.

Impulses F (at *e*) pass over retardation line RL and actuate tube $W_6$, which furnishes the two control impulses C and B. Impulse F passes through the device formed by tubes $W_4$ and $W_7$ (operating in just the same way as the device formed by $V_3$ and $V_4$ in the already described embodiment of Fig. 3 and furnishes the impulse A. This embodiment of the control circuit accordingly furnishes the control impulses necessary for the operation of the device.

It is to be noted that the devices according to the invention may be employed in circuits such as junction, connection or register circuits, and they play a part similar to that of the multiple finder group in automatic telephone or in telegraph systems. They can accordingly find numerous uses because, although the present invention has been described for certain embodiments, it is evident that it is by no means limited thereto, and that the same are capable of numerous modifications and adaptations without departing from the scope of the invention.

What I claim is:

1. An impulse communication system comprising a first circuit adapted to carry trains of time spaced pulses, each train being spaced in time from the other trains and representing a discrete signal, a group of second circuits associated with said first circuit, means for establishing and maintaining a connection between said first circuit and a free one of said second circuits at times corresponding to a particular train of pulses, said means comprising a special circuit normally connected to said first circuit, means in said special circuit responsive to the first pulse of said train for seizing said free second circuit, and another circuit controlled by said special circuit connected to and for receiving the following and recurring pulses of said train, said other circuit comprising means for preventing said special circuit from receiving said following and recurring pulses over the normal connection to said first circuit and for thereafter controlling said special circuit.

2. An impulse communication system, as defined in claim 1, in which the second circuits are arranged in series and each second circuit has a special circuit with a portion thereof common to all second circuits, and means is provided connected to each special circuit and operative when a second circuit is seized for connecting the common portion of the special circuit to the next free second circuit at all times except those occupied by the pulses of any train which has seized a preceding second circuit.

3. An impulse communication system, as defined in claim 1, in which, the means for establishing and maintaining a connection between the first circuit and a free one of the second circuits comprises a control circuit normally connected to said first circuit, means in said control circuit responsive to pulses of the train of one discrete signal only for producing recurring control pulses of different time durations, one being a long pulse equal in time duration to the time between adjacent pulses of the train which has seized the second circuit and occurring during that time and another being a short pulse equal in time duration to the time of the signal pulse and occurring simultaneously therewith, means connected to said control circuit and responsive to the long pulse for preparing a connection including a portion of the special circuit from said first circuit to others of said second circuits for the period of said long pulse and means also connected to said control circuit and responsive to said short pulse for connecting said first circuit to said seized second circuit for the period of said short pulse and for breaking the connection between said first circuit and all said second circuits for the same period.

4. An impulse communicating system, as defined in claim 3, in which the second circuits are arranged in succession and each special circuit has a portion common to all second circuits, and in which the means responsive to the long pulse of each second circuit connects said common portion of said special circuit to the next succeeding second circuit.

5. An impulse communication system, as defined in claim 4, in which the means for establishing and maintaining the connection are electronic devices which transmit the pulses.

6. An impulse communication system, as defined in claim 1, in which the second circuits are arranged in succession and the means for establishing and maintaining a connection between the first circuit and a free one of the second circuits comprises a control circuit in each second circuit normally connected to said first circuit, means in said control circuit responsive to pulses of the train of one discrete signal only for producing recurring control pulses of different time durations, one being a long pulse equal in time duration to the time between adjacent pulses of the train which has seized the second circuit and occurring during that time and another being a short pulse equal in time duration to the time of the signal pulse and occurring simultaneously therewith, a connection including a portion of the special circuit from said first circuit to said second circuits, means including an electron tube and responsive to said long pulse for shorting pulses appearing on said connection and belonging to a signal which has seized the second circuit, so that these pulses will not pass to succeeding second circuits, a second connection between said first circuit and said second circuits, and means including an electron tube and responsive to said short pulse for shorting pulses of said signal appearing on said second connection, so that these pulses will not pass to succeeding second circuits.

7. A device according to claim 1, in which the connection means are electronic devices which transmit the pulses.

8. A device according to claim 1, in which the connection means are circuits that comprise electronic means for short-circuiting the pulses.

BORIS DERJAVITCH.

REFERENCES CITED

The following references are of record in the file of this patent:

UNITED STATES PATENTS

| Number | Name | Date |
|---|---|---|
| 1,905,359 | Affel | Apr. 25, 1933 |
| 2,176,901 | Holcomb | Oct. 24, 1939 |
| 2,205,406 | Holcomb | June 25, 1940 |
| 2,277,192 | Wilson | Mar. 24, 1942 |
| 2,301,223 | Mitchell | Nov. 10, 1942 |
| 2,398,018 | Hartley | Oct. 16, 1945 |
| 2,462,896 | Ransom | Mar. 1, 1949 |
| 2,490,833 | Ransom | Dec. 13, 1949 |